US008231969B2

(12) United States Patent
Shumaker-Parry et al.

(10) Patent No.: US 8,231,969 B2
(45) Date of Patent: Jul. 31, 2012

(54) ASYMMETRICALLY FUNCTIONALIZED NANOPARTICLES

(75) Inventors: Jennifer S. Shumaker-Parry, Salt Lake City, UT (US); Rajesh Sardar, Carrboro, NC (US)

(73) Assignee: University of Utah Research Foundation, Salt Lake City, UT (US)

( * ) Notice: Subject to any disclaimer, the term of this patent is extended or adjusted under 35 U.S.C. 154(b) by 608 days.

(21) Appl. No.: 12/412,147

(22) Filed: Mar. 26, 2009

(65) Prior Publication Data

US 2009/0256116 A1    Oct. 15, 2009

Related U.S. Application Data

(60) Provisional application No. 61/039,624, filed on Mar. 26, 2008.

(51) Int. Cl.
  *B32B 5/16* (2006.01)
  *C09K 11/06* (2006.01)
(52) U.S. Cl. .............. 428/403; 252/301.18; 424/489; 977/834; 977/773
(58) Field of Classification Search .......... 977/773, 977/834; 252/301.18; 424/489; 428/403
See application file for complete search history.

(56) References Cited

U.S. PATENT DOCUMENTS

| 7,244,498 | B2* | 7/2007 | Cook et al. ............ 428/402 |
| 2006/0153929 | A1* | 7/2006 | Drake .................. 424/600 |
| 2009/0280188 | A1* | 11/2009 | Mirkin et al. ........... 424/499 |

FOREIGN PATENT DOCUMENTS

| JP | 2004-098246 | 4/2004 |
| JP | 2005 007549 | 1/2005 |
| JP | 2006-205302 | 8/2006 |
| WO | WO 2008/097328 | 8/2008 |
| WO | WO 2008097328 A2 * | 8/2008 |

OTHER PUBLICATIONS

U.S. Appl. No. 12/361,253, filed Jan. 28, 2009; Jennifer S. Shumaker-Parry; office action issued Nov. 23, 2010.
Kendra Snyder, "Nanoparticle Assembly Enters the Fast Lane, Method borrows instructions from molecular code of life", Oct. 11, 2006. www.bnl.gov/bnlweb/pubaf/PR_display.asp?prID=06-112. As accessed on Nov. 26, 2007. pp. 1-2.
Gretchen A. Devries, et al., "Divalent Metal Nanoparticles", Science, vol. 315, Jan. 19, 2007. www.sciencemag.org. pp. 358-361.
Daniela Zanchet et al., "Electrophoretic and Structural Studies of DNA-Directed Nanoparticle Groupings". J. Phys. Chem. B 2002, 106, 11758-11763.

(Continued)

*Primary Examiner* — Satya Sastri
(74) *Attorney, Agent, or Firm* — Thorpe North & Western LLP

(57) ABSTRACT

The invention provides methods and compositions having at least one asymmetrically functionalized nanoparticle. An asymmetrically functionalized nanoparticle can comprise a nanoparticle core having an outer surface, a primary group of first ligands attached to a substantially continuous primary region of the outer surface, and a secondary group of second ligands attached to a substantially continuous secondary region of the outer surface, such that the primary group of first ligands and the secondary group of second ligands comprise a different ligand population.

22 Claims, 9 Drawing Sheets

OTHER PUBLICATIONS

Bing Li et al., "Immobilizing Au Nanoparticles with Polymer Single Crystals, Patterning and Asymmetric Functionalization". J. Am.Chem. Soc. 2007, 129,12-13.

Xiaoyang Xu et al., "Asymmetric Functionalization of Gold Nanoparticles with Oligonucleotides". J. Am. Chem. Soc. 2006, 128, pp. 9286-9287.

Kie-Moon Sung et al., "Synthesis of Monofuctionalized Gold Nanoparticles by Fmoc Solid-Phase Reactions"., J. Am. Chem. Soc. 2004, 126, 5064-5065.

James G. Worden et al., "Controlled functionalization of gold nanoparticles through a solid phase synthesis approach". Chem. Commun., 2004, 518-519.

Belle Dume, "Nanopolymers make their debut-physicsworld.com" Jan. 19, 2007. http://physicsworld.com/cws/article/news/26852. As accessed on Feb. 14, 2008. 2 pages.

Rajesh Sardar et al, "Versatile Solid Phase Synthesis of Gold Nanoparticle Dimers Using an Asymmetric Functionalization Approach." J. Am. Chem. Soc. 2007, 129, 5356-5357. S1-S6.

Fengwei Huo et al., "Asymmetric Functionalization of Nanoparticles Based on Thermally Addressable DNA Interconnects". Advanced Materials 2006, 18, 2304-2306.

U.S. Appl. No. 12/361,253, filed Jan. 28, 2009, Jennifer S. Shumaker-Parry.

Jeong-Hwan Kim et al., "Sequential Solid-Phase Fabrication of Bifunctional Anchors on Gold Nanoparticles for Controllable and Scalable Nanoscale Structure Assembly." Langmuir 2006, 24, 5667-5671.

Bing Li et al., "Poly(ethylene oxide) Single Crystals as Templates for Au Nanoparticle Patterning and Asymmetrical Functionalization". Macromolecules 2008, 41, 149-155.

Rajesh Sardar et al., "Asymmetrically Functionalized Gold Nanoparticles Organized in One-Dimensional Chains", Nano Letters 2008 vol. 8, No. 2 pp. 731-736.

Haeshin Lee et al., "Direct Visualization of Hyaluronic Acid Polymer Chain by Self-Assembled One-Dimensional Array of Gold Nanoparticles". Macromolecules 2006, 39, 23-25.

* cited by examiner

ASYMMETRICALLY FUNCTIONALIZED NANOPARTICLES

RELATED APPLICATION

This application claims the benefit of U.S. Provisional Patent Application Ser. No. 61/039,624 filed Mar. 26, 2008 which is incorporated herein by reference.

BACKGROUND OF THE INVENTION

Nanotechnology refers broadly to a field of applied science and technology whose unifying theme is the control of matter on the atomic and molecular scale, measured in nanometers, and to the fabrication of devices within that size range. Examples of nanotechnology in modern use are the manufacture of polymers based on molecular structure and the design of computer chip layouts based on surface science. Despite the great promise of numerous nanotechnologies such as quantum dots and nanotubes, real commercial applications have mainly used the advantages of colloidal nanoparticles in bulk form, such as suntan lotion, cosmetics, protective coatings, drug delivery, and stain resistant clothing.

Materials reduced to the nanoscale can suddenly show very different properties compared to what they exhibit on a macroscale, enabling unique applications. For instance, opaque substances can become transparent (copper); inert materials can become catalysts (platinum); stable materials can turn combustible (aluminum); solids can turn into liquids at room temperature (gold); insulators can become conductors (silicon). A material such as gold, which is chemically inert at normal scales, can serve as a potent chemical catalyst at nanoscales. Much of the fascination with nanotechnology stems from these unique quantum and surface phenomena that matter exhibits at the nanoscale.

As such, metal nanoparticles have received great attention due to their unique optical properties and wide range of applicability. In this context, controlling the particle-particle interaction is a major challenge to generate programmable assembly of nanoparticles which shows potential usefulness in device fabrication and detection systems. Several methods have been developed to prepare gold nanoparticle assemblies. For example, polymer single crystals, organic bridged ligands, DNA, and solid phase approaches have been used to fabricate gold nanoparticle dimer, trimer, or tetramer assemblies. Considering all of these architectures, dimers are of special interest because of their application as substrates in surface-enhanced Raman spectroscopy (SERS). Theoretical calculations have shown that nanoparticle dimers produce strong electromagnetic field enhancements which contribute efficiently to the signal enhancement in SERS sensing. Among the four listed synthetic methods, DNA-based assembly and solid phase approaches generate dimers with the highest reported yield. However, the DNA-based methods require electrophoretic separation to remove side products to achieve a high yield. On the other hand, the solid phase approaches have been limited to very small particles (<5 nm) and dimers consisting of nanoparticles with similar sizes.

As such, research and developmental efforts continue in the field of nanotechnology in the pursuit of new nano-materials exhibiting unique properties.

SUMMARY OF THE INVENTION

As such, the present invention provides compositions and methods relating to asymmetrically functionalized nanoparticles. In one embodiment, an asymmetrically functionalized nanoparticle can comprise a nanoparticle core having an outer surface, a primary group of first ligands attached to a substantially continuous primary region of the outer surface, and a secondary group of second ligands attached to a substantially continuous secondary region of the outer surface, such that the primary group of first ligands and the secondary group of second ligands comprise a different ligand population.

In another embodiment, a multimer composite nanoparticle, containing at least one asymmetrically functionalized nanoparticle, can comprise an asymmetrically functionalized nanoparticle connected to a secondary nanoparticle via a spacer group. The asymmetrically functionalized nanoparticle can comprise a nanoparticle core, a primary group of first ligands, and a secondary group of second ligands as discussed above.

In yet another embodiment, the invention provides a method of making an asymmetric functionalized nanoparticle, comprising attaching a nanoparticle core to a substrate such that at least a portion of a primary region on an outer surface of the core is exposed, functionalizing at least a portion of the exposed outer surface by reacting the exposed outer surface with a first ligand to form a substantially continuous primary region of the first ligand, releasing the nanoparticle core from the substrate to expose a non-functionalized outer surface of the nanoparticle core, and functionalizing at least a portion of the non-functionalized outer surface by reacting the non-functionalized outer surface with a second ligand to form a substantially continuous secondary region of the second ligand. Additionally, as previously discussed, the primary region of the first ligand and the secondary region of the second ligand can comprise a different ligand population.

In still yet another embodiment, a method of tuning optical properties of a dimer, can comprise choosing a spacer group with a predetermined length to achieve a target optical property, attaching a primary asymmetrically functionalized nanoparticle to the spacer group, attaching a secondary nanoparticle to the spacer group, such that the spacer group is oriented between the primary asymmetrically functionalized nanoparticle and the secondary nanoparticle.

The asymmetrically functionalized nanoparticle can comprise a nanoparticle core, a primary group of first ligands, and a secondary group of second ligands as discussed above.

Additional features and advantages of the invention will be apparent from the detailed description which follows, taken in conjunction with the accompanying drawings, which together illustrate, by way of example, features of the invention.

Figure 1A:
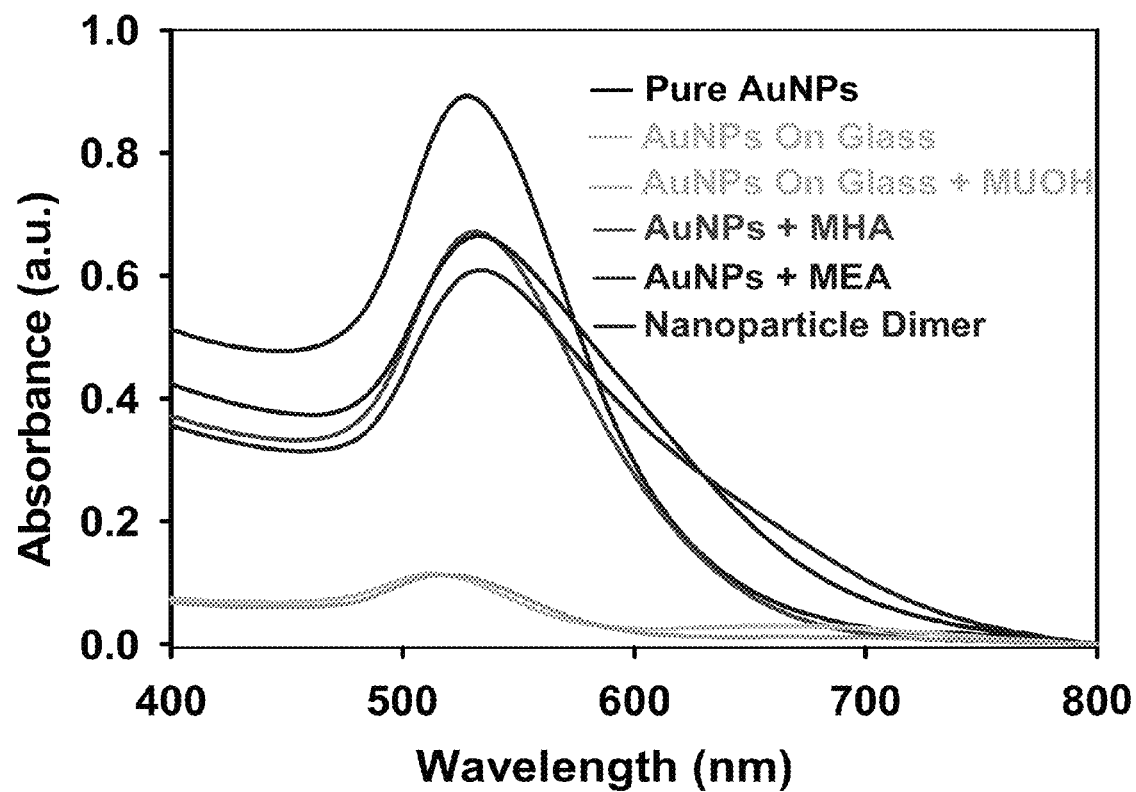
FIG. 1(A) is UV-visible absorption spectra of gold nanoparticle before and after functionalization including resulting dimers in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

It must be noted that, as used in this specification and the appended claims, the singular forms "a," "an," and "the" include plural referents unless the context clearly dictates otherwise. Thus, for example, reference to "a dimer" includes one or more of such materials, reference to "a ligand" includes reference to one or more of such ligands, and reference to an "attaching" step includes reference to one or more of such steps.

DEFINITIONS

In describing and claiming the present invention, the following terminology will be used in accordance with the definitions set forth below.

As used herein, "nanoparticle" refers to any molecule, compound, or material measuring less than 1 μm. Such measurements include length, width, height, and diameter. Nanoparticles also often have at least one dimension which is less than about 100 nm.

As used herein, "react" or "reacting" refers to any interaction between the identified materials which results in an association of the identified materials. A reaction of materials can result in formation and/or destruction of chemical bonds, ionic association, or the like.

As used herein, "population" refers to the ligand content or makeup of any given group or region. As such, "population" can refer to the number of ligands, i.e., 25% vs. 75%, and/or the ligand composition; i.e., ligand A vs. ligand B. As such, when describing an asymmetrically functionalized particle, "differing population" or "different population" can refer to the first ligands of the primary group having at least one ligand not in common with the second ligands of the secondary group or can refer to a different concentration of first ligands of the primary group as compared to the second ligands of the secondary group. For example, a primary group having mercaptoethylamine and 11-mercapto-1-undecanol and a secondary group having 16-mercaptohexadecanoic acid and 11-mercapto-1-undecanol can qualify as different populations since the two groups contain at least one ligand not in common (in this example there are two); i.e., mercaptoethylamine and 16-mercaptohexadecanoic acid. Additionally, for example, a primary group containing 75% mercaptoethylamine and 25% 11-mercapto-1-undecanol and a secondary group containing 50% mercaptoethylamine and 50% 11-mercapto-1-undecanol can qualify as different populations since the concentration or ratio of ligands in the respective groups is different.

The present description of "differing populations" or "different populations" can also apply to compositions having more than one asymmetrically functionalized nanoparticle. For instance, the term "differing population" or "different population" can refer to the first and/or second ligands of a first asymmetrically nanoparticle and the first and/or second ligands of a second asymmetrically functionalized nanoparticle that have at least one ligand not in common or can refer to a different concentration or ratio of the first and/or second ligands of the first asymmetrically nanoparticle as compared to the first and/or second ligands of the second asymmetrically functionalized nanoparticle.

Additionally, even though "differing population" or "different population" has been generally defined as different ligands or a differing ratio or concentration of ligands, in one embodiment of the present invention, the compositions and methods described herein may require that the differing population or different population have a different ligand composition regardless of the ligand concentrations or ratios. Additionally, in one embodiment, the compositions and methods described herein may require that the differing population or different population require differing ratios or concentrations of ligands regardless of the ligand composition.

As used herein, "ligand" generally refers to an atom, ion, or molecule that generally donates one or more of its electrons through a coordinate covalent bond to, or shares its electrons through a covalent bond with, one or more central atoms or ions. Additionally, as used herein, a "ligand" is capable of attaching to the surface of a nanoparticle core, as described herein. Such attachment may be by various bonding types; including ionic, covalent, coordinate, or any combination thereof, and may also be by adsorption on the core surface. When referring to a ligand in general throughout the following description, such discussion can be equally applied to the first and/or second ligands as used herein.

As used herein, "multimer" refers to a nano-sized compound having at least two nanoparticles attached thereto. The multimers, described herein, generally have at least two nanoparticles, at least one of which being an asymmetrically functionalized nanoparticle, connected via a spacer group. The multimers can be connected in various configurations. For example, a multimer can be connected linearly, circularly, or in a branched configuration.

As used herein, "cleaving" refers to breaking of the attachment of an immobilized nanoparticle from a substrate. Additionally, "cleaving" may be used to mobilize an otherwise immobilized nanoparticle.

As used herein, "transmission electron microscopy" or "TEM" refers to an imaging technique whereby a beam of electrons is transmitted through a specimen, then an image is formed, magnified, and directed to appear either on a fluorescent screen or layer of photographic film, or to be detected by a sensor. TEM imaging is well known in the art.

As used herein, "surface-enhanced Raman spectroscopy" or "SERS" refers to a surface sensitive technique that results in the enhancement of Raman scattering by molecules adsorbed on rough metal surfaces.

As used herein, "surface plasmon resonance" or "SPR" refers to the excitation of surface plasmons by light, such surface plasmons are generally fluctuations in the electron density at the boundary of two materials. As provided herein, such excitation is measured by absorbance.

As used herein, "fully functionalized" refers to the substantial functionalization of a particle's surface, as defined herein. In one embodiment, "fully functionalized" can be accomplished when the particle's surface is at least 95% functionalized. The degree of functionalization in the present invention can depend on the number of ligands and how they pack or organize of the surface of nanoparticles. Such arrangement on free particles is different than the way ligands behave when adsorbing or binding to substantially larger particles or planar surfaces due to the curvature of the nanoparticles. Thus, the density can depend on the nanoparticle size (due to curvature) and also the ligand (due to packing constraints).

As used herein, "substantially" or "substantial" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still contain such an item as long as there is no measurable effect thereof.

As used herein, "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. When used in describing the percentage of ligand surface coverage of a nanoparticle, the term "about" indicates ±10%.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 10 to about 50" should be interpreted to include not only the explicitly recited values of about 10 to about 50, but also include individual values and sub-ranges within the indicated range. Thus, included in this numerical range are individual values such as 20, 30, and 40 and sub-ranges such as from 10-30, from 20-40, and from 30-50, etc. This same principle applies to ranges reciting only one numerical value. Furthermore, such an interpretation should apply regardless of the breadth of the range or the characteristics being described.

Invention

The present invention provides methods and compositions having at least one asymmetrically functionalized nanoparticle. Even though the present invention can be discussed in terms of distinct methods and compositions, the following discussions are applicable to each embodiment as provided herein. In other words, when discussing an asymmetrically functionalized nanoparticle in a composition or multimer, such a discussion is equally applicable to a method of making such a composition or multimer as well as methods of tuning dimers, and vice versa.

Surprisingly, it has been discovered that nanoparticles can be asymmetrically functionalized using ligands. In one embodiment, an asymmetrically functionalized nanoparticle can comprise a nanoparticle core having an outer surface, a primary group of first ligands attached to a substantially continuous primary region of the outer surface, and a secondary group of second ligands attached to a substantially continuous secondary region of the outer surface, such that the primary group of first ligands and the secondary group of second ligands comprise a different ligand population.

The present invention relates generally to asymmetrically functionalized nanoparticles. More particularly, the present invention relates to methods of making asymmetrically functionalized nanoparticles, methods of tuning dimers having at least one asymmetrically functionalized nanoparticle, asymmetrically functionalized nanoparticle compositions, and compositions containing asymmetrically functionalized nanoparticles; including dimers, trimers, and multimers.

The nanoparticle core can comprise or consist essentially of a member selected from the group consisting of metals, semi-metals, and mixtures thereof. In one embodiment, the nanoparticle core can comprise or consist essentially of a member selected from the group consisting of gold, sliver, copper, platinum, semiconductor nanocrystals, metal oxides, semiconductors such as CdSe, CdSe/CdS, CdTe, ZnSe, mixtures thereof, and combinations thereof. In one embodiment, the nanoparticle core can be gold. Additionally, the nanoparticles can be presented as particles or nanoshells, or having various shapes such as, but not limited to, prisms, cubes, rods, stars, half-shells or half-cups, nanorice, nanoeggs, crescents, etc. For example, a dielectric core with a metal shell around the outside (Namoi Halas, Rice University) can be suitable. In one embodiment, the core can be spherical. When referring to a spherical embodiment, the core need not be perfectly spherical but may be substantially spherical, i.e., the surface of the core may contain asperities or may be slightly misshapened. Additionally, the core can be any size such that the resulting particle remains a nanoparticle. As such, the core size may vary from as little as a couple nanometers to as large as several hundred nanometers as measured by diameter or by length. In one embodiment, the core can be from about 2 nm to about 500 nm. In another embodiment, the core can be from about 5 nm to about 100 nm. In yet another embodiment, the core can be from about 5 nm to about 75 nm, about 5 nm to about 50 nm, about 5 nm to about 30 nm, about 10 nm to about 70 nm, about 10 nm to about 50 nm, about 20 nm to about 70 nm, about 20 nm to about 50 nm, or even about 25 nm to about 75 nm.

The ligands described herein, including first and/or second ligands, can comprise or consist essentially of a member selected from the group consisting of: amides, amines, acids, alcohol, esters, ketones, aldehydes, alkanes, alkenes, alkynes, arenes, ethers, substitutions thereof, derivatives thereof, combinations thereof, and mixtures thereof. In one embodiment, the first and/or second ligands can be carboxylic acids and/or amines. In another embodiment, the first and/or second ligands can comprise a member selected from the group consisting of: 11-mercapto-1-undeconal, mercaptoethylamine, 1-mercapto-11-undecyl tetra(ethylene glycol), 16-hydroxy-1-hexadecanethiol, 16-mercaptohexadecanoic acid, and especially, 4-aminophenol, 4-aminothiophenol, and 4-nitrothiophenol, mixtures thereof, combinations thereof, and derivatives thereof. In general, any alkylthiol with an acid, amine, or alcohol group at the opposite end of the thiol group can be suitable. In some cases, it may be desirable to have a single ligand type for each of the first and second ligands such that each can independently consist essentially of one of these or other suitable ligands. A wide range of amine- and carboxylic-acid-terminated alkyl thiols, etc, can also be suitable. The ligands described herein can also be characterized in functional terms. In one embodiment, the ligands can comprise a member selected from the group consisting of hydrophobic ligands, hydrophilic ligands, anionic ligands, cationic ligands, polar ligands, non-polar ligands, monodentate, bidentate, polydentate, biomolecule-based ligands (e.g. ligand-receptor with proteins and oligonucleotides for hybridization), combinations thereof, and mixtures thereof.

As previously discussed, the asymmetrically functionalized nanoparticles can comprise a primary group of first ligands and a secondary group of second ligands. In one embodiment, the primary group can cover from about 10% to about 90% of the surface. In another embodiment, the primary group can cover from about 50% to about 80% of the surface. Additionally, the secondary group can cover from about 10% to about 90% of the surface. In one embodiment, the secondary group can cover from about 50% to about 80% of the surface. In another embodiment, the primary and secondary groups can each cover about 50% of the surface.

Additionally, the asymmetrically functionalized nanoparticles can be partially or fully functionalized. In one embodiment, the asymmetrically functionalized nanoparticles can comprise ligands that functionalize at least 75% of the surface of the nanoparticle. In another embodiment, the asymmetrically functionalized nanoparticles can comprise ligands that functionalize at least 85% of the surface of the nanoparticle. In still another embodiment, the asymmetrically functionalized nanoparticles can comprise ligands that functionalize at least 95% of the surface of the nanoparticle. The present degree of functionalization is not limiting as the surface of the nanoparticle can be functionalized in other amounts including, for example, 25%, 35%, 50%, 65%, etc.

In addition to the nanoparticles previously described, the present invention provides multimers containing nanoparticles. A multimer composite nanoparticle can contain at least one asymmetrically functionalized nanoparticle and can comprise an asymmetrically functionalized nanoparticle connected to a second nanoparticle via a spacer group. The asymmetrically functionalized nanoparticle can be those as described herein.

The second nanoparticle can be any functionalized or unfunctionalized nanoparticle. As such, the second nanoparticle can comprise a metal or semi-metal. Such a nanoparticle can then be further functionalized in a symmetric fashion or asymmetric fashion, as described herein, or may be attached to the multimer in an unfunctionalized form.

In one embodiment, the second nanoparticle is a second asymmetrically functionalized nanoparticle. As such, in one embodiment, a multimer can comprise an asymmetrically functionalized nanoparticle connected to a second asymmetrically functionalized nanoparticle via a spacer group, where the asymmetrically functionalized nanoparticle comprises a) a nanoparticle core having an outer surface; b) a primary group of first ligands attached to a substantially continuous primary region of the outer surface; and c) a secondary group of second ligands attached to a substantially continuous secondary region of the outer surface; and the second asymmetrically functionalized nanoparticle comprises a) a second nanoparticle core having an outer surface; b) a second primary group of first ligands attached to a substantially continuous primary region of the outer surface; and c) a second secondary group of second ligands attached to a substantially continuous secondary region of the outer surface; such that the populations of the primary group and secondary group of the asymmetrically functionalized nanoparticle and the second primary group and second secondary group of the second asymmetrically functionalized nanoparticle are different, respectively. Additionally, the groups of the asymmetrically functionalized nanoparticle may or may not have a different population than the groups of the second asymmetrically functionalized nanoparticle. As such, in one embodiment, the first and/or second groups of the asymmetrically functionalized nanoparticle can have the same population as the first and second groups of the second asymmetrically functionalized nanoparticle. In another embodiment, the first and/or second groups of the asymmetrically functionalized nanoparticle can have different populations than the first and/or second groups of the second asymmetrically functionalized nanoparticle.

In addition to the second nanoparticle being a second asymmetrically functionalized nanoparticle, the second nanoparticle can be the same as the asymmetrically functionalized nanoparticle. Alternately, as previously discussed, the second asymmetrically functionalized nanoparticle can be different than the asymmetrically functionalized nanoparticle. The differences between the nanoparticles may be described in physical or chemical structures, connectivity, and/or properties. For example, two substantially identical asymmetrically functionalized nanoparticles may be attached to a spacer group through different ligands in the same or differing regions on the nanoparticles which may give rise to different chemical properties. Such a multimer may be described as having different nanoparticles since the multimer may have different chemical properties than a multimer having the substantially identically asymmetrically functionalized nanoparticles attached to the same spacer group through the same ligands in the same or differing regions. In other words, a multimer can be described as having different asymmetrically functionalized nanoparticles even if the individual asymmetrically functionalized nanoparticles are the same since they may be attached to the spacer group in multiple configurations arising to differing multimers, i.e., multimers having differing chemical structures, connectivity, and/or properties.

In one embodiment, the differences between the second asymmetrically functionalized nanoparticle and the asymmetrically functionalized nanoparticle can be due to differing populations of ligands, different cores, and/or different core sizes. As such, in one embodiment, the asymmetrically functionalized nanoparticle and the second asymmetrically functionalized nanoparticle can be different but have the same cores. In another embodiment, the nanoparticle core of the asymmetrically functionalized nanoparticle can be different than the second nanoparticle core of the second asymmetrically functionalized nanoparticle. As such, the nanoparticle core can be of a different material than the second nanoparticle core. Additionally, the nanoparticle core of the asymmetrically functionalized nanoparticle can be a different size than the second nanoparticle core of the second asymmetrically functionalized nanoparticle. In one embodiment, the nanoparticle core and the second nanoparticle core can have a diameter ratio of from about 0.1 to about 10. In another embodiment, the diameter ratio can be about 0.5 to about 2. In yet another embodiment, the diameter ratio can be about 0.1 to about 5, about 0.1 to about 2, about 0.1 to about 1, about 0.2 to about 10, about 0.3 to about 10, about 0.2 to about 7, about 0.2 to about 5, about 0.2 to about 2, about 0.2 to about 0.1, about 0.5 to about 10, about 0.5 to about 7, about 0.5 to about 5, about 0.5 to about 2, about 0.5 to about 1, about 1 to about 10, about 1 to about 7, about 1 to about 5, about 1 to about 2, about 2 to about 7, or even about 2 to about 5.

As previously discussed, the multimers described herein can have at least two nanoparticles. In one embodiment, the multimer can be a dimer. In another embodiment, the multimer can be a trimer. In yet another embodiment, the multimer can be a tetramer.

The spacer group can be any an organic chain having a predetermined length. In one embodiment, the predetermined length can be about 0.5 nm to about 20 nm. In another embodiment, the predetermined length can be about 0.5 nm to about 1 nm, about 1 nm to about 2 nm, about 2 nm to about 3 nm, or even about 3 nm to about 20 nm. For example, a spacer group of 12 nm can be used in a multi-layer system with biomolecules such as an antibody tethered to the alkylthiol-based ligand or for oligonucleotides. The spacer group can be functionalized or unfunctionalized, substituted or unsubstituted, and/or linear or branched. In one embodiment, the spacer group can be predominately a carbon chain. Additionally, the carbon chain can contain heteroatoms. Suitable spacers can also include the ligands such as those described herein. For examples, spacers can be complementary thiolated oligonucleotides on two different particles that hybridize to link the nanoparticles together. In another example, spacers can be based on covalent coupling between ω-functionalized alklythiolates on the nanoparticles. For example, a carboxylic-acid terminated alklythiolate can form an amide bond with an amine-terminated alkylthiolate. The number of methylene groups (i.e., carbons in the chain) in the alklythiolates can be changed to provide spacing control. Similarly, the number of oligonucleotides in the previous example can be used to provide spacing control. Another common interaction that can be used as a spacer is biotin-streptavidin. Biotin-terminated alklytiolate can also be used in the asymmetric functionalization process. When streptavidin is used, the biotins will bind to binding sites on either side of the protein and therefore form a spacer between the nanoparticles. Non-limiting examples of specific thiol spacers which can be suitable can include 1,11-Undecanedithiol, 11-(2,2,2-Trifluoroethoxy-1-undecanethiol), 1,16-Hexadecanedithiol, 11-Amino-1-undecanethiol hydrochloride, 11-Bromo-1-undecanethiol, 111-Hydroxy-1-undecanethiol, 11-Mercaptoundecanamide, 11-Mercaptoundecanoic acid, 11-Mercaptoundecene, 11-Mercaptoundecyl phosphoric acid, 11-Mercaptoundecyl trifluoroacetate, 11-Phenoxy undecanethiol, 12-Mercpatododecanoic acid, 16-Hydroxy-1-hexadecanethiol, 16-Mercaptohexadecanoic acid, 1,9-Nonanedithiol, 1-Dodecanethiol, 1-Hexadecanethiol, (1-Mercapto-11-undecyl) hexa(ethylene glycol), (1-Mercapto-11-undecyl) tetra(ethylene glycol), (1-Mercapto-11-undecyl) tri(ethylene glycol), 1-Nonanethiol, 1-Undecanethiol, 6-Mercaptohexanoic acid, Aldehyde-terminated undecyl disulfide, Azide-terminated undecyl disulfide, Benzyl mercaptan, Biotin-terminated tri(ethylene glycol)hexadecanethiol, Biotin-terminated tri(ethylene glycol)undecanethiol, Bromoisobutyrate undecyl disulfide, Carboxyhexadecyl disulfide, Carboxylic acid-capped tetra (ethylene glycol)undecanethiol, Carboxyundecyl disulfide, Dodecyl disulfide, Ferrocenyl undecanethiol, Hexadecyl disulfide, Hydroxyhexadecyl disulfide, Hydroxyundecyl disulfide, Methoxy-capped hexa(ethylene glycol)undecanethiol, Methoxy-capped tetra(ethylene glycol)undecanethiol, Methoxy-capped tri(ethylene glycol)undecanethiol, Methyl 11-Mercaptoundecanoate, Methyl 16-Mercaptohexadecanoate, Nonyl disulfide, p-Nitrothiophenol, p-Thiocresol, Tetra(ethylene glycol) undecyl disulfide, Undecyl disulfide, and combinations of these thiols (most of these are commercially available from Asemblon Inc.).

In addition to the compositions described herein, the present invention provides methods associated with nanoparticles. In one embodiment, a method of making the multimer previously described can comprise attaching an asymmetrically functionalized nanoparticle to a spacer group; and attaching a second nanoparticle to the spacer group; such that the spacer group is oriented between the asymmetrically functionalized nanoparticle and the secondary nanoparticle.

Generally, a method of making an asymmetrically functionalized nanoparticle can comprise a) attaching a nanoparticle core to a substrate such that at least a portion of a primary region on an outer surface of the core is exposed; b) functionalizing at least a portion of the exposed outer surface by reacting the exposed outer surface with a first ligand to form a substantially continuous primary region of the first ligand; c) releasing the nanoparticle core from the substrate to expose a non-functionalized outer surface of the nanoparticle core; and d) functionalizing at least a portion of the non-functionalized outer surface by reacting the non-functionalized outer surface with a second ligand to form a substantially continuous secondary region of the second ligand, such that the primary region of the first ligand and the secondary region of the second ligand comprise a different ligand population. Such a method can provide a fully functionalized nanoparticle and is further illustrated in FIG. 11.

Generally, the nanoparticle core can be attached through an organic functional group on the substrate; however, this is not required. Any means to immobilize the nanoparticle core may be used in conjunction with the methods of the present invention, e.g. electrostatic interactions, ligand-receptor interactions, and the like. Once immobilized, the exposed outer surface can be functionalized by reacting a functional group of the first ligand with the exposed outer surface. The functional group can be any organic functional group, including, without limitation, amides, amines, acids, alcohol, esters, ketones, aldehydes, alkanes, alkenes, alkynes, arenes, ethers, heteroatoms, substitutions thereof, derivatives thereof, combinations thereof, and mixtures thereof. After functionalizing a portion of the surface of the nanoparticle or a region of the surface of the nanoparticle, the nanoparticle can then be released from the substrate or otherwise mobilized. Generally, such functionalization can be in a substantially continuous region. In other words, the portion of the surface that is exposed to the ligands can generally be reacted with the ligands; however, such a reaction can be stoichiometrically controlled to provide a region that is not continuous. For example, providing small amounts of ligands may result in a primary region having a first ligand non-continuously attached to the surface followed by a second ligand reaction on the remaining non bound surface. Such a reaction scheme could provide a substantially continuous region of mixed ligands. Additionally, such a reaction scheme allows for complete or full functionalization of the nanoparticle surface. In one embodiment, the nanoparticle core having a substantially continuous primary region of a first ligand can be released from the substrate by cleaving the nanoparticle from the substrate. Such cleaving may be accomplished by any mechanical, physical, and/or chemical force depending on the nature of the interaction (as mentioned above) environmental changes can be used, such as a pH change, a salt concentration change, or even a chemical cleavage. In one embodiment, cleaving can be achieved by sonicating the nanoparticle core.

Once the nanoparticle core is released from the substrate or otherwise mobilized, at least a portion of the non-functionalized outer surface can be functionalized by reacting a functional group of the second ligand with the at least a portion of the non-functionalized outer surface. As discussed above, subsequent functionalization of the non-functionalized outer surface can be accomplished by a mixture of ligands. Additionally, once two regions of the outer surface of the core have been functionalized, the nanoparticle may contain additional non-functionalized surface areas. If such areas are present, they may be further functionalized, including fully functionalized, or may be left unfunctionalized in accordance with the methods and compositions discussed herein.

In addition to synthesizing multimers and asymmetrically functionalized nanoparticles, a method of tuning optical properties of a dimer can comprise a) choosing a spacer group with a predetermined length to achieve a target optical property; b) attaching a primary asymmetrically functionalized nanoparticle to the spacer group, c) attaching a secondary nanoparticle to the spacer group, such that the spacer group is oriented between the primary asymmetrically functionalized nanoparticle and the secondary nanoparticle. The primary asymmetrically functionalized nanoparticle can be any asymmetrically functionalized nanoparticle described herein. Additionally, the second nanoparticle can be any nanoparticle described herein including a second asymmetrically functionalized nanoparticle.

The target optical property can be any optical property associated with asymmetrically functionalized nanoparticles. In one embodiment, the target optical property is absorbance. The property is really tuning the localized plasmon resonance properties. These include the extinction efficiency, the wavelength position of the plasmon band, and the localized electromagnetic field enhancements. These are specific to metal nanoparticles. Other properties can include fluorescence enhancement (also due to the plasmon position and the local electromagnetic field enhancements).

Generally, the present invention demonstrates how asymmetrically functionalized nanoparticles can provide unique properties and can be incorporated into composites including dimers and other multimers. For metal nanoparticles, a plasmon resonance wavelength tunability range can include the visible and near infrared, e.g. 400-800 or 600-800 nm.

EXAMPLES

The following examples illustrate various embodiments of the invention. Thus, these examples should not be considered as limitations of the present invention, but are merely in place to teach how to implement the present invention based upon current experimental data. As such, a representative number of systems are disclosed herein.

Example 1

Functionalization of Glass Surfaces and Subsequent Adsorption of Gold Nanoparticles Glass coverslips were functionalized with 3-aminopropyltriethoxy-silane according to known procedures. The coverslips were cleaned by placing them in an aqueous 20% RBS detergent solution heated to 90° C. and sonicating for 5 minutes. The coverslips were copiously rinsed with nanopure water and then immersed in a 1:1 (v/v) solution of methanol and concentrated HCl for 30 minutes. The coverslips were rinsed thoroughly with nanopure water and left to dry overnight in an oven at 60° C. The clean coverslips were then placed in a 10% (v/v) solution of (3-aminopropyl)triethoxysilane in anhydrous ethanol for 30 minutes. The coverslips were sonicated and then rinsed with anhydrous ethanol and dried at 120° C. for 3 h. Finally, the silanized glass coverslips were immersed in aqueous gold nanoparticle solution for 24 h at room temperature.

Example 2

Functionalization of Gold Nanoparticles with 11-mercapto-1-undecanol

A self-assembled monolayer (SAM) of 11-mercapto-1-undecanol (MUOH) was formed on the surface of the gold nanoparticles by incubation of the nanoparticle-coated coverslips from example 1 in a 1 mM solution of 11-mercapto-1-undecanol for 2 h at room temperature. After formation of the 11-mercapto-1-undecanol SAMs, the surface was thoroughly rinsed with ethanol to remove unreacted thiols, dried using nitrogen, and stored at 4° C. in a $N_2$ atmosphere.

Example 3

Figure 4:
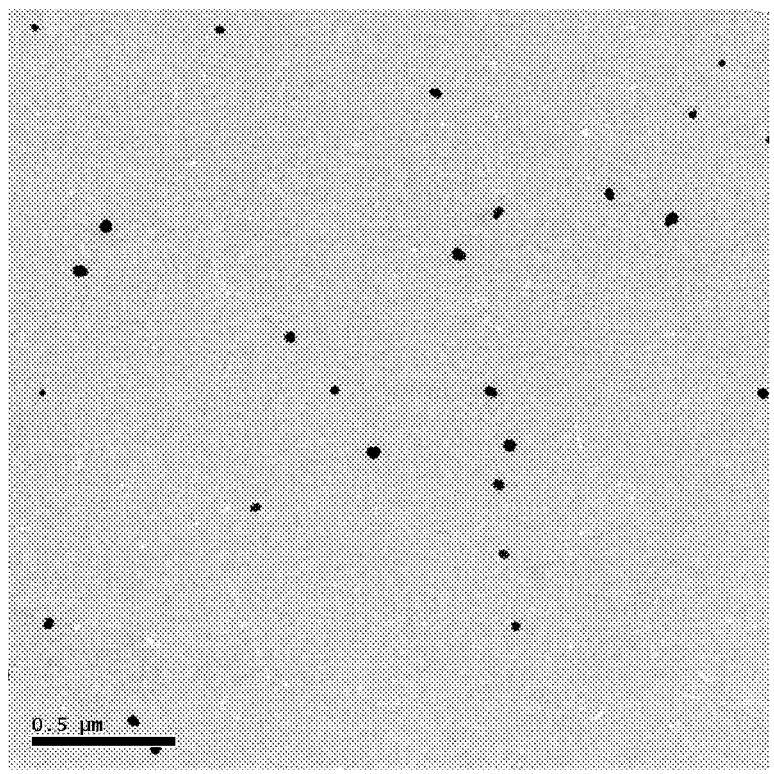
FIG. 4 is a TEM image of partially 16-mercaptohexadecanoic acid (MHA) functionalized gold nanoparticles having a diameter of 41 nm.

Asymmetric Functionalization of (11-mercapto-1-undecanol)-Capped Gold Nanoparticles from Example 2 with 16-mercaptohexadecanoic acid The 11-mercapto-1-undecanol functionalized gold nanoparticles adsorbed on the silanized glass surface from Example 2 were sonicated for 5 minutes in 5 mL of ethanol containing 50 µl of 1 mM of 16-mercaptohexadecanoic acid (MHA) in ethanol for 5 minutes forming the asymmetrically functionalized nanoparticle. The resulting TEM image is shown in FIG. 4.

Example 4

Figure 5:
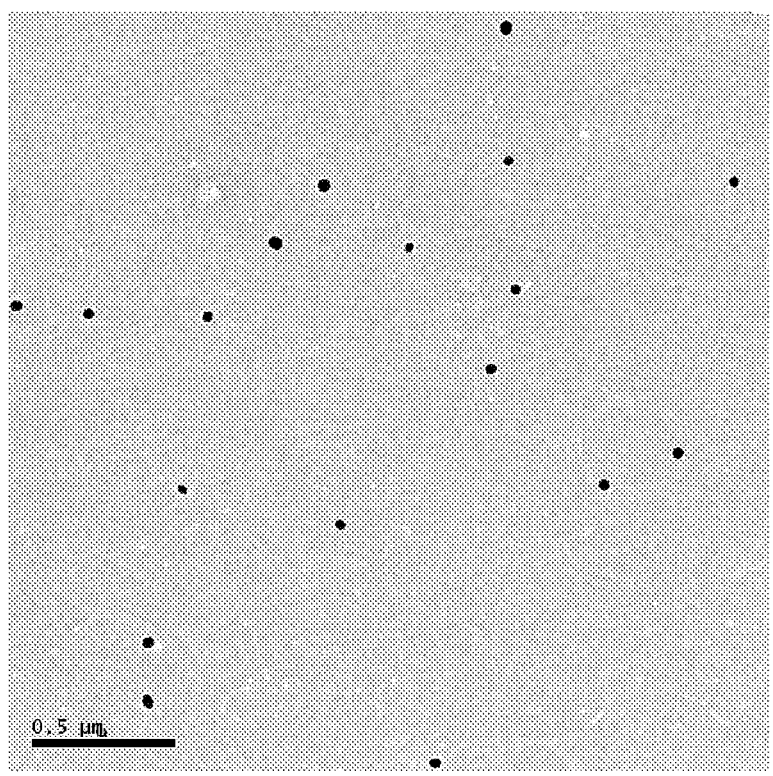
FIG. 5 is a TEM image of partially mercaptoethylamine (MEA) functionalized gold nanoparticles having a diameter of 41 nm.

Asymmetric Functionalization of (11-mercapto-1-undecanol)-Capped Gold Nanoparticles from Example 2 with mercaptoethylamine The 11-mercapto-1-undecanol functionalized gold nanoparticles adsorbed on the silanized glass surface from Example 2 were sonicated for 5 minutes in 5 mL of ethanol containing 50 µl of 1 mM of mercaptoethylamine (MEA) in ethanol for 5 minutes forming the asymmetrically functionalized nanoparticle. The resulting TEM image is shown in FIG. 5.

Example 5

Formation of Dimers Using the Asymmetrically Functionalized Nanoparticles of Examples 3 and 4

Figure 8:
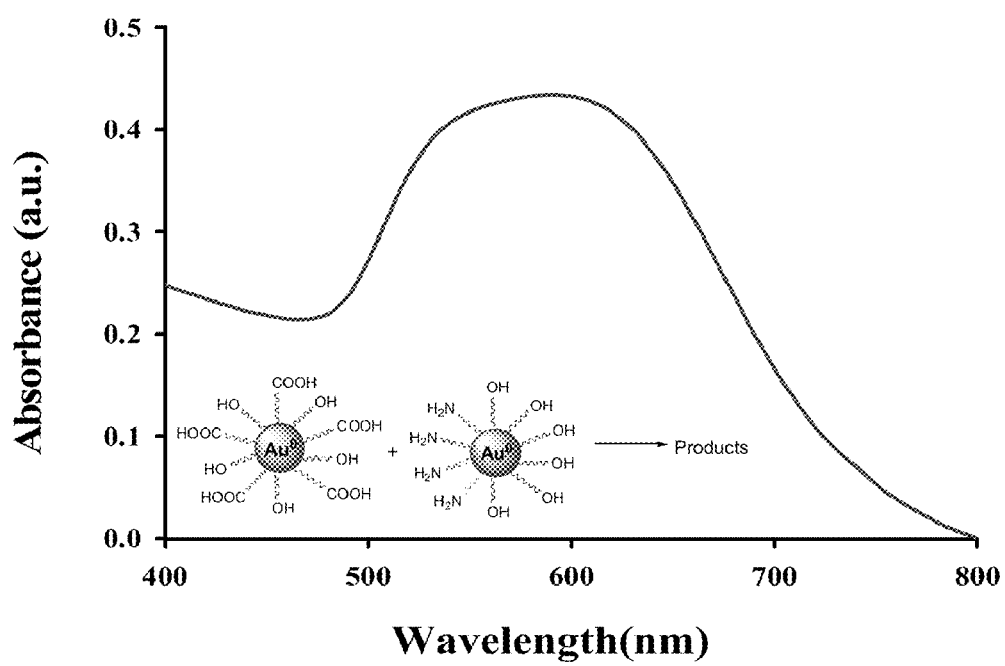
FIG. 8 is UV-visible absorption spectrum of crosslinked gold nanoparticles assembly formed by reacting an MEA induced asymmetrically functionalized nanoparticle with an 11-mercapto-1-undecanol (MUOH)/16-mercaptohexadecanoic acid (MHA) functionalized nanoparticle, in accordance with an embodiment of the present invention.
Figure 9:
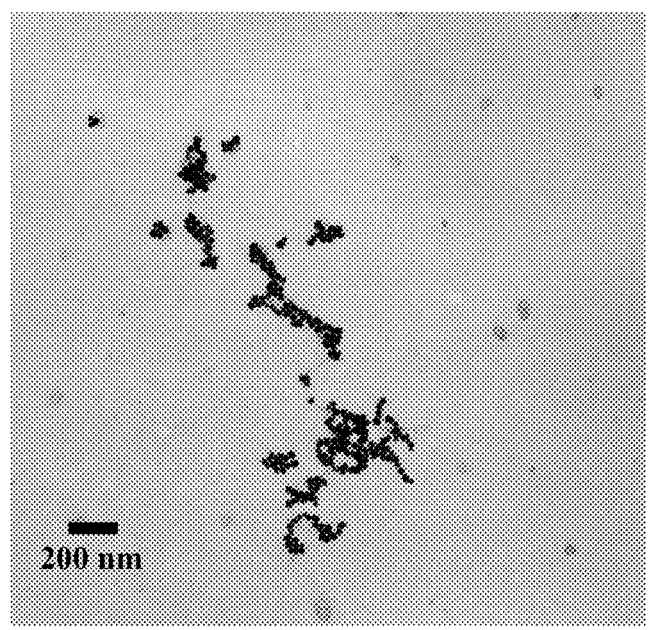
FIG. 9 is a TEM image of the crosslinked nanoparticle assemblies of FIG. 8, in accordance with an embodiment of the present invention.

The MHA-functionalized gold nanoparticles of Example 3 were then reacted with 100 µl of 0.1 M 1-ethyl-3-(3-dimethylaminopropyl)-carbodiimide hydrochloride (EDAC) and 100 µl of 0.2 M 1-pentafluorophenol (PFP) for 2 h at room temperature followed by the addition of MEA-functionalized gold nanoparticles of Example 4. The reaction mixture was stirred gently at room temperature for 4 h under a nitrogen atmosphere resulting in the formation of dimers, as shown in FIG. 9 having a UV-vis absorption spectrum as shown in FIG. 8.

Figure 6:
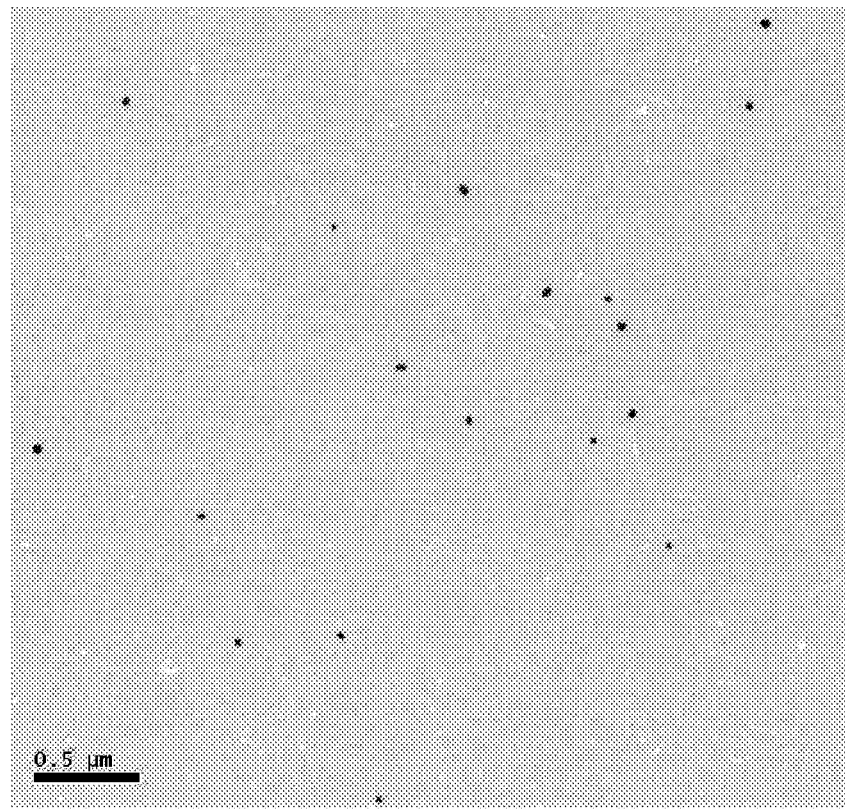
FIG. 6 is a TEM image of control experiment of 40-nm-diameter gold nanoparticles functionalized with MHA and MEA without coupling agents EDAC and PFP.

The above reaction schemes were verified by mixing the asymmetrically functionalized nanoparticles from Examples 3 and 4 but without the coupling agents EDAC or PFP. The resulting TEM image shows no dimer formation, as shown in FIG. 6.

Figure 10:
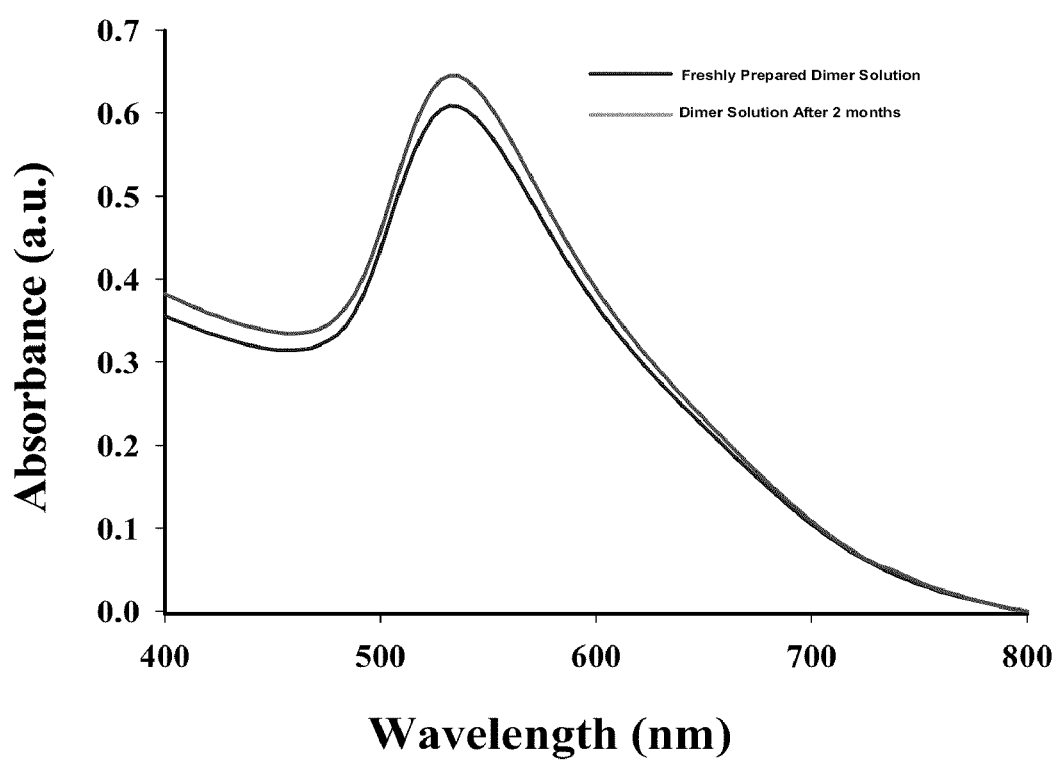
FIG. 10 is a UV-visible absorption spectra comparison of a freshly prepared dimer solution and the solution after two months.

The dimer solution showed remarkable stability over a period of two months after storage at 4° C. under a nitrogen atmosphere as illustrated by the UV-vis absorption spectra shown in FIG. 10.

Example 6

Figure 11:
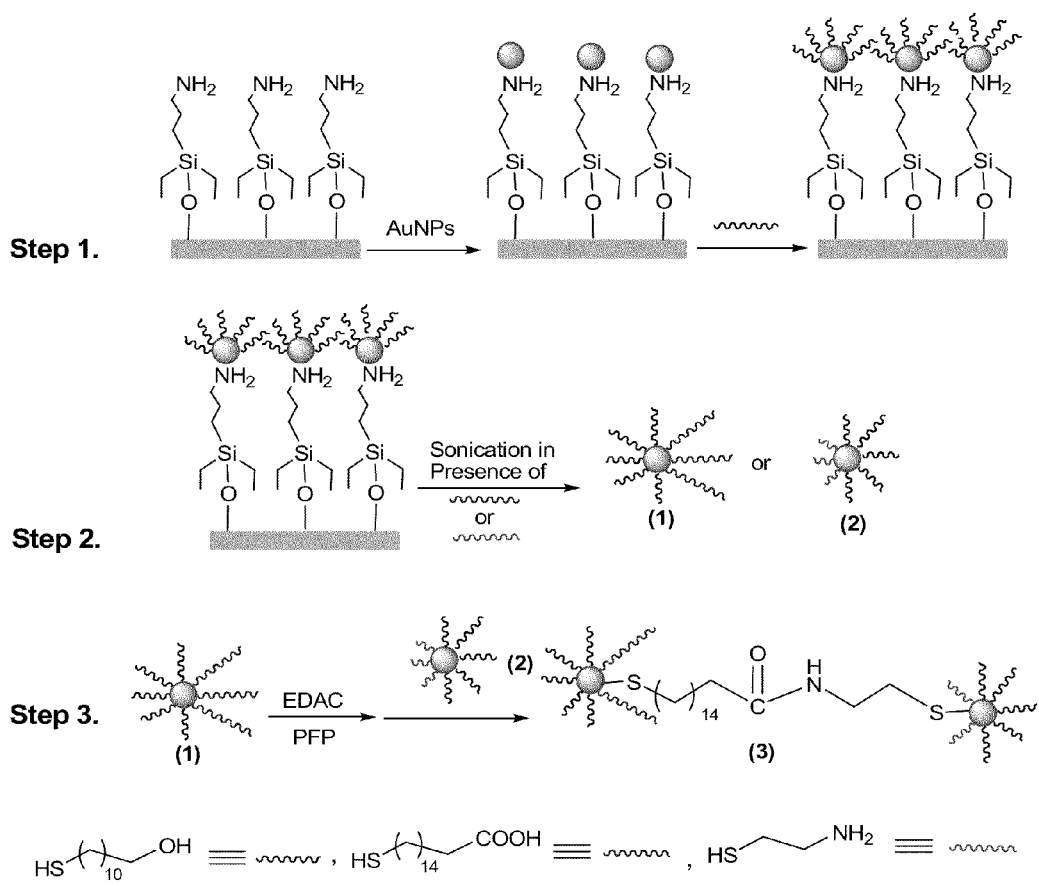
FIG. 11 is a reaction schematic for producing asymmetrically functionalized gold nanoparticles in accordance with an embodiment of the present invention.

Formation of Homodimers Using an Asymmetrically Functionalized (11-mercapto-1-undecanol/16-mercaptohexadecanoic acid) Gold (41 nm) Nanoparticle and Using an Asymmetrically Functionalized (11-mercapto-1-undecanol/mercaptoethylamine) gold (41 nm) Nanoparticle Asymmetrically Functionalized Nanoparticle Formation Citrate-stabilized 41-nm-diameter nanoparticles were immobilized on a silanized glass surface and a blue shift of the resonance peak ($\lambda_{max}$ of 513 nm) was observed, similar to the shift for surface-immobilized 39-nm-diameter gold colloids reported in the literature. The nanoparticles on the silane-functionalized glass surface were then reacted with 1 mM 11-mercapto-1-undecanol (MUOH) in ethanol for 2 h, resulting in the formation of a self-assembled monolayer (SAM) of thiol molecules on the outer surface of the closely packed nanoparticles. A 7-nm red shift of the SPR peak was detected ($\lambda_{max}$ of 520 nm) which was likely due to a change of refractive index caused by thiol adsorption on the nanoparticle surfaces. In order to remove the particles from the substrate, the MUOH-functionalized nanoparticles were sonicated in 5 ml of ethanol containing 50 µl of 16-mercaptohexadecanoic acid (MHA) for 5 minutes to generate component 1 ($\lambda_{max}$ of 532 nm) of Scheme 1, as illustrated in FIG. 11, step 2. Due to the inaccessibility of MUOH to the region of the nanoparticles adsorbed on the substrate, the MHA molecules are asymmetrically bound only to the surface area of the AuNPs which was attached to the silane layer.

A similar protocol was followed to functionalize the AuNPs with mercaptoethylamine (MEA) yielding component 2 ($\lambda_{max}$ of 533-nm), as illustrated in FIG. 11, step 2.

Dimer Formation

Generation of dimers from these nanoparticles was achieved according to step 3 of Scheme 1 as illustrated in FIG. 11. Specifically, the MHA functionalized AuNPs 1 were then reacted with 100 µl 1-ethyl-3-(3-dimethylaminopropyl)-carbodiimide hydrochloride (EDAC) and 100 µl 1-pentafluorophenol (PFP) for 2 h followed by the addition of MEA functionalized gold nanoparticles 2. The reaction mixture was stirred at room temperature for 4 h to produce a new dimer component 3 which had an SPR maximum at 533 nm, as shown in step 3 of Scheme 1, as illustrated in FIG. 11.

Identification

Figure 1B:
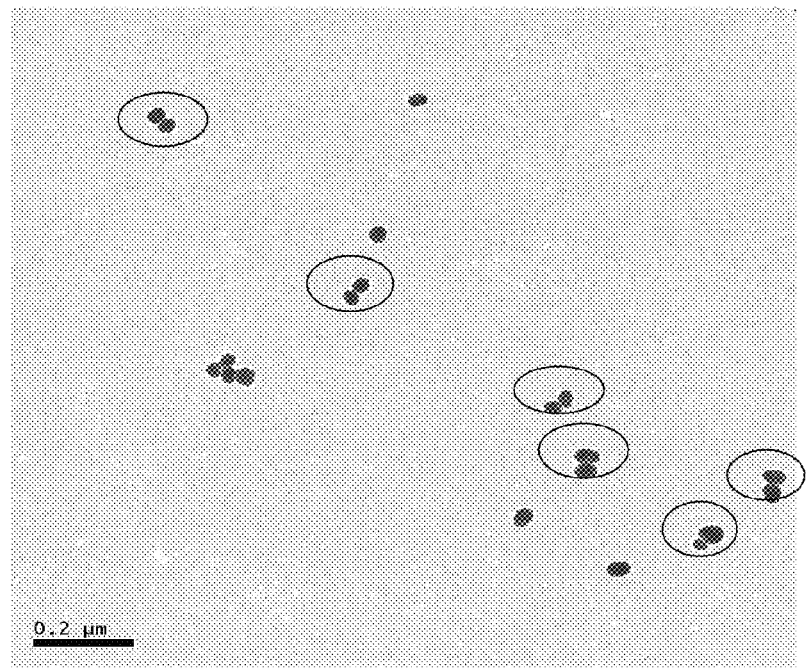
FIG. 1(B) is a transmission electron microscopy (TEM) image of gold nanoparticle dimers in accordance with an embodiment of the present invention.

UV-visible absorption spectroscopy was used to characterize the surface plasmon resonance (SPR) properties of the nanoparticles both in solution and immobilized on a glass substrate and the resulting dimer as shown in FIG. 1A. Components 1, 2, and 3 from Scheme 1, as shown in FIG. 11, were separately analyzed by transmission electron microscopy (TEM). The TEM analysis showed MHA 1 and MEA 2 functionalized AuNPs produced individual nanoparticles with no traces of particle agglomeration. TEM analysis of component 3 confirmed the formation of gold nanoparticle dimers with ~46% yield. The yield for each batch of dimers was found by counting at least 100 particles from ~20-25 TEM images of the same sample. The dimer yield is defined as the percentage of dimers observed in the SEM images compared to the total number of structures where single particles, dimers, trimers, and other clusters were counted as unique structures. FIG. 1B shows a TEM image of dimers consisting of two ~41-nm-diameter AuNPs.

The dimers formed when partially amine functionalized AuNPs were reacted with AuNPs asymmetrically functionalized with carboxylic acid groups in the presence of coupling reagents. To validate the present reaction scheme, two control experiments were performed. In the first experiment when components 1 and 2 were mixed together without EDAC and PFP, the TEM analysis showed the presence of individual spherical gold nanoparticles and no dimers. In a second experiment, the nanoparticles were functionalized with a 50:50 mixture of MUOH and MHA and reacted with component 2 in the presence of EDAC and PFP. After 4 hours, the reaction mixture was analyzed by UV-visible spectroscopy and produced a broad maximum ($\lambda$max of 550-630 nm), which was red-shifted relative to the dimer sample peak. TEM analysis confirmed that the solution did not contain nanoparticle dimers. Instead, agglomerated particles with random orientations were observed.

Example 7

Figure 2A:
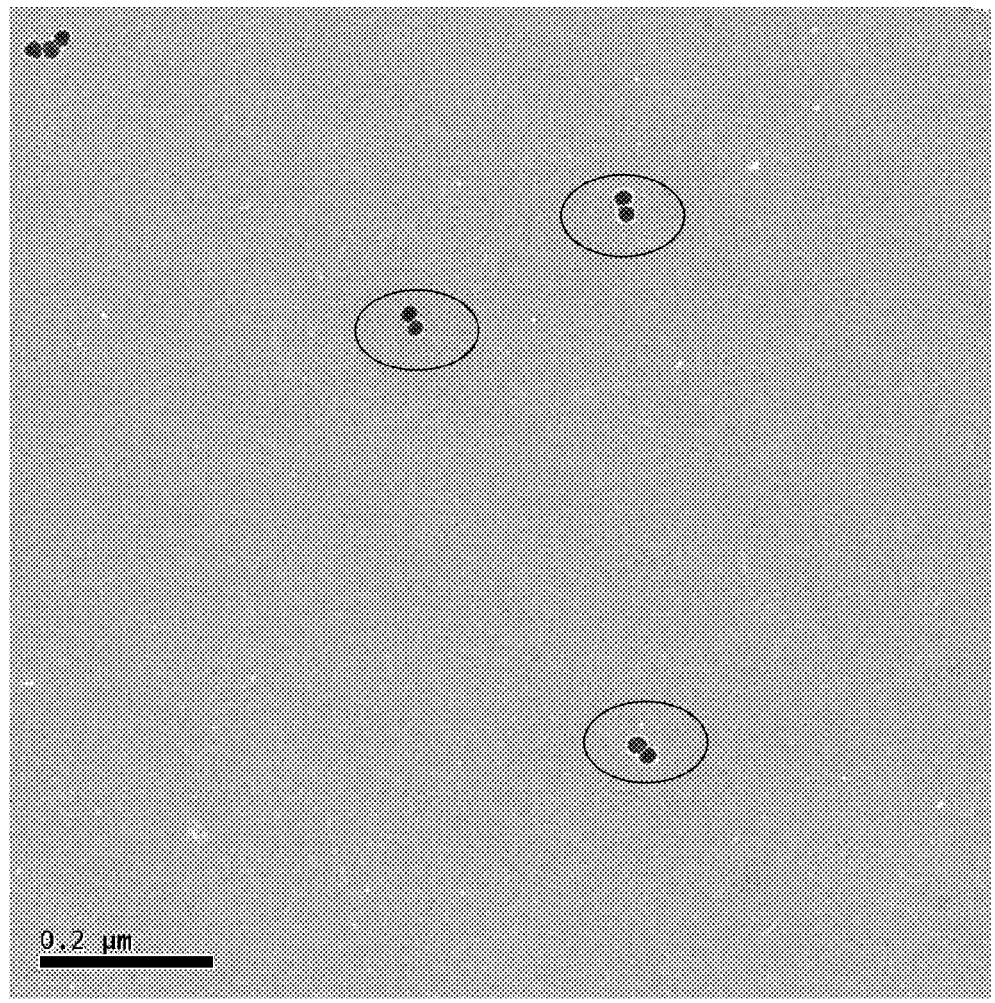
FIG. 2(A) is a TEM image of homodimers of the gold nanoparticle dimers, having a diameter of 16 nm, in accordance with an embodiment of the present invention.
Figure 2B:
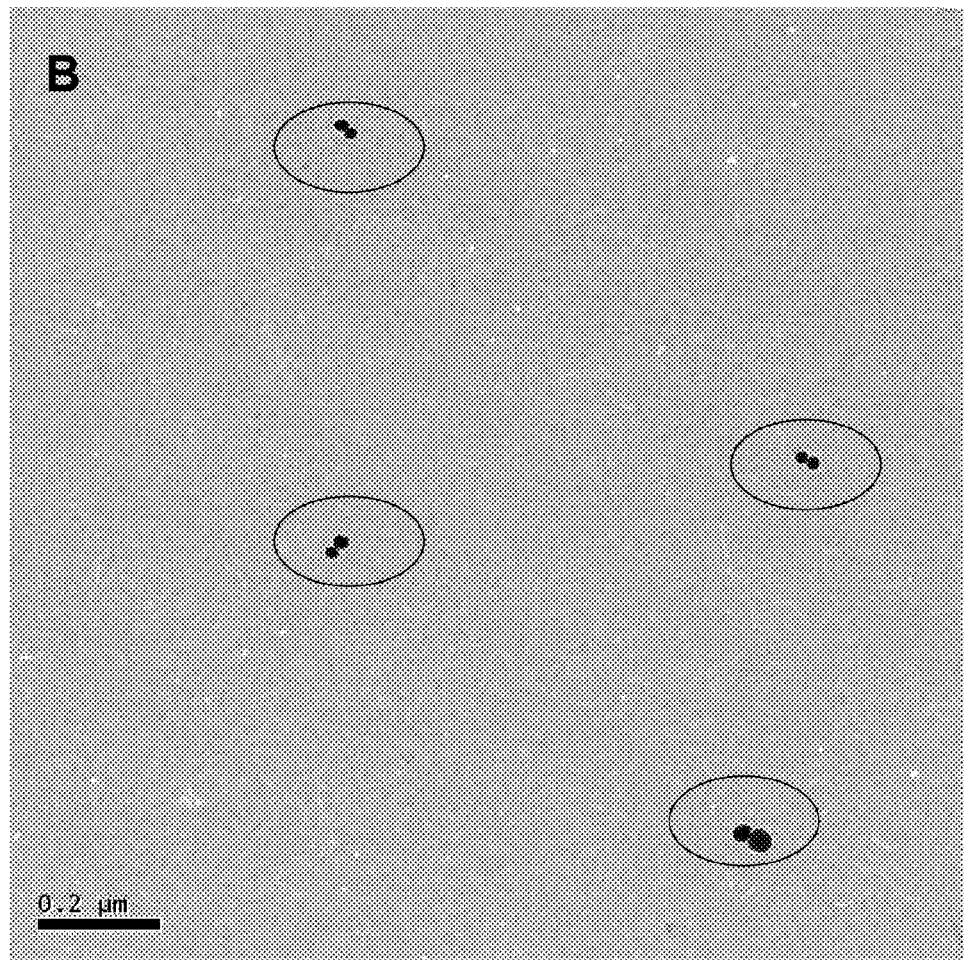
FIG. 2(B) is a TEM image of homodimers of gold nanoparticle having a diameter of 30 nm, in accordance with an embodiment of the present invention.

Formation of Homodimers using Asymmetrically Functionalized (11-mercapto-1-undecanol/16-mercaptohexadecanoic acid) Gold (30 nm, 16 nm) Nanoparticles and Using Asymmetrically Functionalized (11-mercapto-1-undecanol/mercaptoethylamine) Gold (30 nm, 16 nm) Nanoparticles The syntheses of other homodimers (16-16 nm and 30-30 nm) also were carried out using the reaction scheme of Example 10. When the dimerization reaction was used with smaller particles (16-16 nm), ~65% of the product consisted of gold nanoparticle dimers. This yield is higher compared to the dimers synthesized using rigid organic ligands. In the case of 30-nm-diameter colloids, ~57% particles were gold nanoparticle dimers. FIGS. 2A and 2B are TEM images of the 16-16 nm and 30-30 nm dimers.

Example 8

Figure 3A:
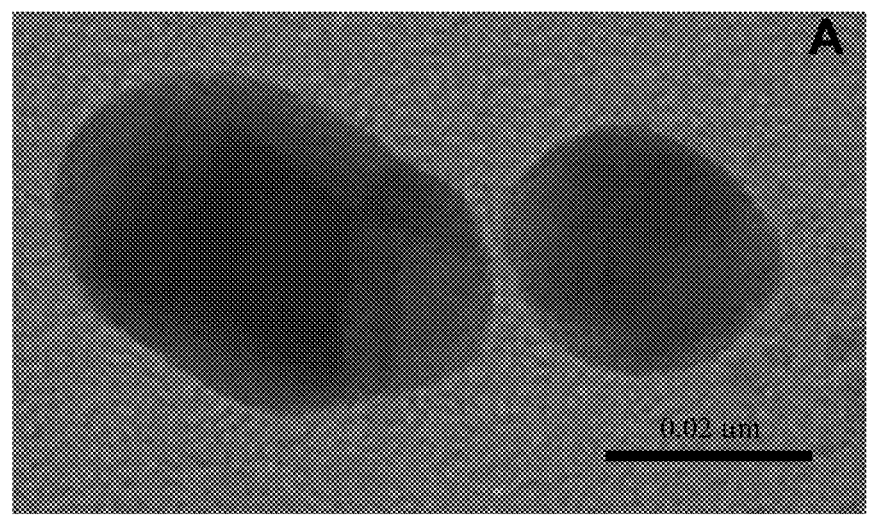
FIG. 3(A) is a TEM of heterodimers of gold nanoparticle having a diameter of 41 nm and 30 nm, in accordance with an embodiment of the present invention.
Figure 3B:
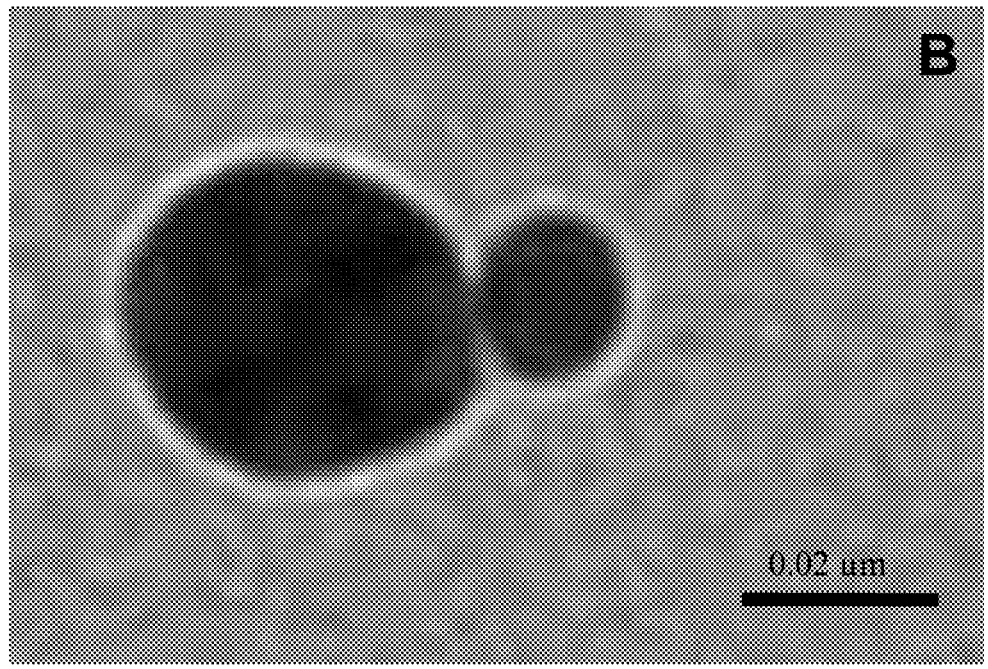
FIG. 3(B) is a TEM of homodimers of gold nanoparticle having a diameter of 41 nm and 16 nm, in accordance with an embodiment of the present invention.
Figure 3C:
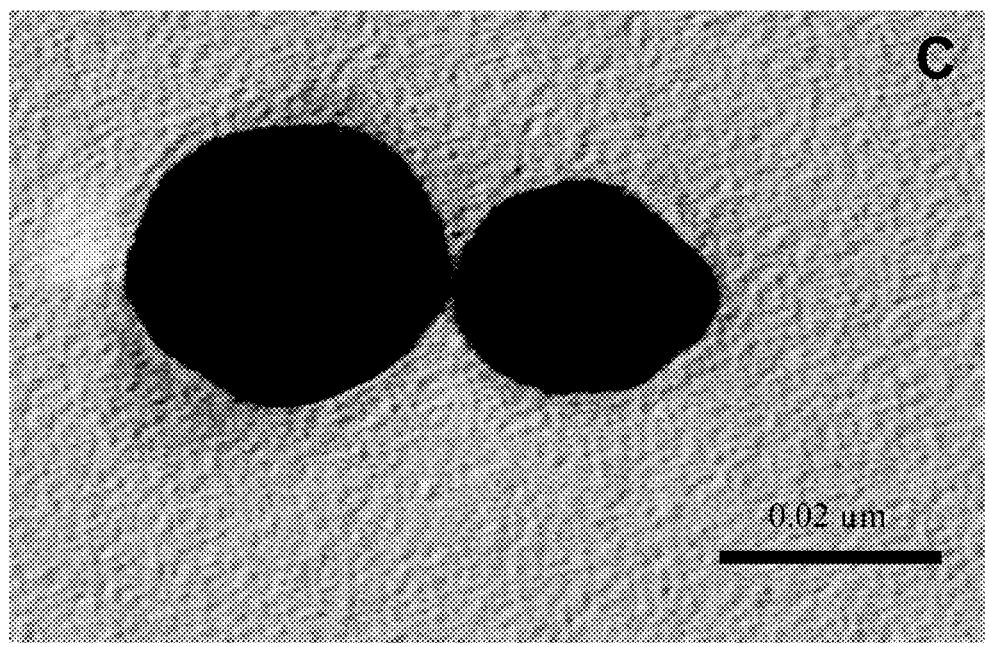
FIG. 3(C) is a TEM of homodimers of gold nanoparticle having a diameter of 30 nm and 16 nm, in accordance with an embodiment of the present invention.
Figure 7:
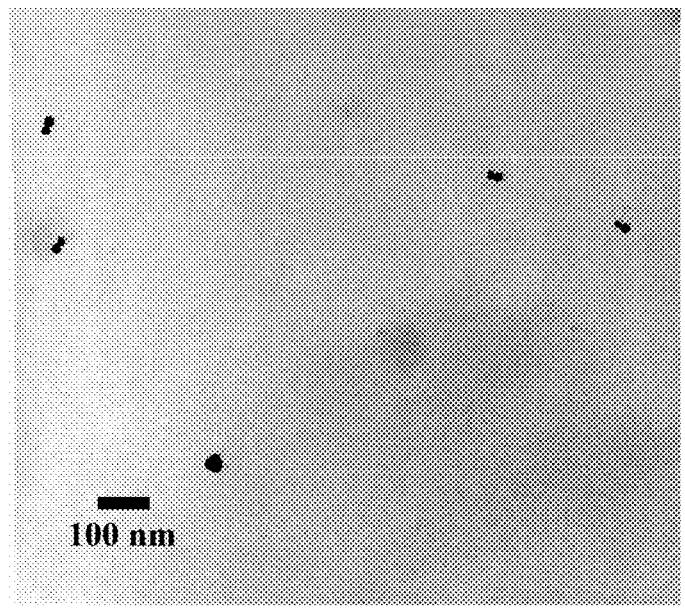
FIG. 7 is a TEM image of homodimers of gold nanoparticle having a diameter of 30 nm and 16 nm, in accordance with an embodiment of the present invention.

Formation of Heterodimers Using Asymmetrically Functionalized (11-mercapto-1-undecanol/16-mercaptohexadecanoic acid) Gold (41 nm, 30 nm) Nanoparticles and Using Asymmetrically Functionalized (11-mercapto-1-undecanol/mercaptoethylamine) Gold (30 nm, 16 nm) Nanoparticles The synthesis of heterodimers, 41 nm-30 nm, 41 nm-16 nm, and 30 nm-16 nm MHA/MUOH and MEA/MUOH nanoparticles, respectively, was carried out using the synthetic procedures described in Example 10. In each case, approximately 30, 50, 10, and 10 percent particles were dimers, trimers, tetramers, and individual single particles, respectively. The resulting TEM images of the 41 nm-30 nm, 41 nm-16 nm, and 30 nm-16 nm dimers are illustrated in FIGS. 3A, 3B, and 3C, respectively. FIG. 7 also shows a TEM image of the 30 nm-16 nm heterodimer, although a similar heterodimer of 16 nm-30 nm could also be formed.

At least a portion of the above discussion regarding formation of gold nanoparticle dimmers can be found in Sardar et al., *Versatile Solid Phase Synthesis of Gold Nanoparticle Dimers Using an Asymmetric Functionalization Approach*, J. Am. Chem. Soc. 2007, 129, 5356-5357, which is incorporated herein by reference.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. An asymmetrically functionalized nanoparticle, comprising:
   a) a nanoparticle core having an outer surface;
   b) a primary group of first ligands covalently attached to a substantially continuous primary region of the outer surface; and
   c) a secondary group of second ligands covalently attached to a substantially continuous secondary region of the outer surface;
   wherein the primary group of first ligands and the secondary group of second ligands comprise a different ligand population and wherein each of the primary group and secondary group covers from about 10% to about 90% of the surface.

2. The asymmetrically functionalized nanoparticle of claim 1, wherein the nanoparticle core comprises a member selected from the group consisting of metals, semiconductors, metal oxides and mixtures thereof.

3. The asymmetrically functionalized nanoparticle of claim 2, wherein the nanoparticle core comprises a member selected from the group consisting of gold, silver, copper, platinum, semiconductor nanocrystals, metal oxides, semiconductors, CdSe, CdSe/CdS, CdTe, ZnSe, mixtures thereof, and combinations thereof.

4. The asymmetrically functionalized nanoparticle of claim 1, wherein each of the first ligands and second ligands comprise a member selected from the group consisting of amides, amines, acids, alcohol, esters, ketones, aldehydes, alkanes, alkenes, alkynes, arenes, ethers, substitutions thereof, derivatives thereof, combinations thereof, and mixtures thereof.

5. The asymmetrically functionalized nanoparticle of claim 4, wherein each of the first ligands and second ligands comprise a member selected from the group consisting of 11-mercapto-1-undeconal, mercaptoethylamine, 1-mercapto-11-undecyl tetra(ethylene glycol), 16-hydroxy-1-hexadecanethiol, 16-mercaptohexadecanoic acid, 4-aminophenol, 4-aminothiophenol, 4-nitrothiophenol, mixtures thereof, combinations thereof, and derivatives thereof.

6. The asymmetrically functionalized nanoparticle of claim 1, wherein the first ligands and/or second ligands comprise a member selected from the group consisting of hydrophobic ligands, hydrophilic ligands, anionic ligands, cationic ligands, polar ligands, non-polar ligands, monodentate, bidentate, polydentate, biomolecule-based ligands including ligand-receptor with proteins and oligonucleotides for hybridization, combinations thereof, and mixtures thereof.

7. The asymmetrically functionalized nanoparticle of claim 1, wherein the asymmetrically functionalized nanoparticle is fully functionalized.

8. A multimer composite nanoparticle containing at least one asymmetrically functionalized nanoparticle as in claim 1, comprising the asymmetrically functionalized nanoparticle connected to a second nanoparticle via a spacer group.

9. The multimer of claim 8, wherein the spacer group is an organic chain having a predetermined length.

10. The multimer of claim 8, wherein the second nanoparticle is a second asymmetrically functionalized nanoparticle, comprising:
    a) a second nanoparticle core having an outer surface;
    b) a second primary group of first ligands attached to a substantially continuous primary region of the outer surface; and
    c) a second secondary group of second ligands attached to a substantially continuous secondary region of the outer surface;
    wherein the second primary group of first ligands and the second secondary group of second ligands comprise a different ligand population.

11. The multimer of claim 10, wherein the multimer has an amide spacer group and two asymmetrically functionalized nanoparticles having a gold nanoparticle core with a primary group of 11 mercapto-1-undeconal and a secondary group of 16-mercaptohexadecanoic acid.

12. The multimer of claim 10, wherein the nanoparticle core is the same as the second nanoparticle core.

13. The multimer of claim 10, wherein the nanoparticle core is a different size than the second nanoparticle core.

14. The multimer of claim 10, wherein the nanoparticle core and the second nanoparticle core have a diameter ratio of from about 0.1 to about 10.

15. The multimer of claim 10, wherein the multimer is a dimer or trimer.

16. A method of making the multimer of claim 8, comprising;
    a) attaching the asymmetrically functionalized nanoparticle to the spacer group; and
    b) attaching the second nanoparticle to the spacer group;
    wherein the spacer group is oriented between the asymmetrically functionalized nanoparticle and the second nanoparticle.

17. A method of making an asymmetrically functionalized nanoparticle, the asymmetrically functionalized nanoparticle comprising:
   a) a nanoparticle core having an outer surface;
   b) a primary group of first ligands attached to a substantially continuous primary region of the outer surface; and
   c) a secondary group of second ligands attached to a substantially continuous secondary region of the outer surface;
   wherein the primary group of first ligands and the secondary group of second ligands comprise a different ligand population and wherein each of the primary group and secondary group covers from about 10% to about 90% of the surface;
   the method comprising:
   i) attaching the nanoparticle core to a substrate such that at least a portion of the primary region on the outer surface of the core is exposed;
   ii) functionalizing at least a portion of the exposed outer surface by reacting the exposed outer surface with the first ligand to form the substantially continuous primary region of the first ligand;
   iii) releasing the nanoparticle core from the substrate to expose a non-functionalized outer surface of the nanoparticle core; and
   iv) functionalizing at least a portion of the non-functionalized outer surface by reacting the non-functionalized outer surface with the second ligand to form the substantially continuous secondary region of the second ligand.

18. The method of claim 17, wherein the nanoparticle core is attached through an organic functional group on the substrate; the exposed outer surface is functionalized by reacting a functional group of the first ligand with the exposed outer surface; the nanoparticle core having the substantially continuous primary region of the first ligand is released from the substrate by cleaving the nanoparticle from the substrate; and the at least a portion of the non-functionalized outer surface is functionalized by reacting a functional group of the second ligand with the at least a portion of the non-functionalized outer surface.

19. The asymmetrically functionalized nanoparticle of claim 1, wherein either the first ligands or second ligands comprise an alkyl thiol with an acid, amine, or alcohol group at the opposite end of the thiol group.

20. The asymmetrically functionalized nanoparticle of claim 1, wherein both the first ligands and second ligands comprise an alkyl thiol with an acid, amine, or alcohol group at the opposite end of the thiol group.

21. The asymmetrically functionalized nanoparticle of claim 1, wherein either the first ligands or second ligands comprise an amine-terminated alkyl thiol or a carboxylic acid-terminated alkyl thiol.

22. The asymmetrically functionalized nanoparticle of claim 1, wherein both the first ligands and second ligands comprise an amine-terminated alkyl thiol or a carboxylic acid-terminated alkyl thiol.

* * * * *